United States Patent
Holmes

(10) Patent No.: US 11,369,104 B2
(45) Date of Patent: Jun. 28, 2022

(54) PEST TRAP

(71) Applicant: Pelsis Limited, North Yorkshire (GB)

(72) Inventor: Tom Holmes, North Yorkshire (GB)

(73) Assignee: PELSIS LIMITED, North Yorkshire (GB)

( * ) Notice: Subject to any disclaimer, the term of this patent is extended or adjusted under 35 U.S.C. 154(b) by 34 days.

(21) Appl. No.: 15/583,988

(22) Filed: May 1, 2017

(65) Prior Publication Data

US 2018/0310543 A1  Nov. 1, 2018

(51) Int. Cl.
*A01M 1/04* (2006.01)
*A01M 1/14* (2006.01)
*A01M 1/10* (2006.01)

(52) U.S. Cl.
CPC .............. *A01M 1/145* (2013.01); *A01M 1/04* (2013.01); *A01M 1/106* (2013.01)

(58) Field of Classification Search
CPC ............ A01M 1/04; A01M 1/14; A01M 1/16; A01M 1/106; A01M 1/02; A01M 1/22; A01M 1/223; A01M 1/145
USPC .................................. 43/113, 114, 115, 112
See application file for complete search history.

(56) References Cited

U.S. PATENT DOCUMENTS

| | | | | |
|---|---|---|---|---|
| 3,023,539 A * | 3/1962 | Emerson, Jr. | ......... | A01M 1/145 43/113 |
| 4,074,457 A * | 2/1978 | Sato | ...................... | A01M 1/145 43/113 |
| 4,127,961 A * | 12/1978 | Phillips | .................... | A01M 1/08 43/113 |
| 4,709,503 A * | 12/1987 | McQueen | ............... | A01M 1/14 43/114 |
| 4,949,501 A * | 8/1990 | Larkin | .................. | A01M 1/145 43/113 |
| 5,203,816 A * | 4/1993 | Townsend | ............. | A01M 1/145 43/113 |
| 5,231,790 A * | 8/1993 | Dryden | ................. | A01M 1/145 43/113 |
| 5,425,197 A * | 6/1995 | Smith | ..................... | A01M 1/04 43/113 |
| 5,713,153 A * | 2/1998 | Cook | ...................... | A01M 1/14 43/114 |
| 5,722,199 A * | 3/1998 | Demarest | .............. | A01M 1/145 43/113 |

(Continued)

FOREIGN PATENT DOCUMENTS

AT         5739         11/2002
CA     2795312 A1 * 10/2011 ............ A01M 1/023

(Continued)

OTHER PUBLICATIONS

Translation of JP 2001-86916 (Year: 2001).*
European Search Report for Application No. 16196020.8 dated Mar. 21, 2017 (7 pages).

*Primary Examiner* — Darren W Ark
(74) *Attorney, Agent, or Firm* — Michael Best & Friedrich LLP

(57) ABSTRACT

A flying pest trap (8) includes an attraction section (16), an immobilisation section (12), a body section (10) adapted to retain the attraction section (16) and the immobilisation section (12), and a power section (20) adapted to provide power to the attraction section (16). The attraction section (16) includes at least one LED light source located behind the immobilisation section (12).

3 Claims, 7 Drawing Sheets

(56) References Cited

U.S. PATENT DOCUMENTS

| | | | | |
|---|---|---|---|---|
| 6,108,966 A * | 8/2000 | Otomo | A01M 1/145 | 43/113 |
| 6,393,759 B1 * | 5/2002 | Brown | A01M 1/023 | 43/113 |
| 6,397,515 B1 * | 6/2002 | Brown | A01M 1/023 | 43/113 |
| 6,481,152 B1 * | 11/2002 | Gray | A01M 1/145 | 43/113 |
| 6,655,080 B2 * | 12/2003 | Spiro | A01M 1/023 | 43/107 |
| 6,758,009 B1 * | 7/2004 | Warner | A01M 1/145 | 43/113 |
| 6,886,292 B2 * | 5/2005 | Studer | A01M 1/145 | 43/112 |
| 7,308,774 B2 * | 12/2007 | Lin | A01M 1/145 | 43/113 |
| 7,784,215 B2 * | 8/2010 | Cohnstaedt | A01M 1/04 | 362/231 |
| 7,937,887 B2 * | 5/2011 | Child | A01M 1/023 | 43/113 |
| 8,079,175 B2 * | 12/2011 | Calkins | A01M 1/145 | 43/113 |
| 8,341,873 B2 * | 1/2013 | Frisch | A01M 1/145 | 43/113 |
| 8,341,874 B2 * | 1/2013 | Studer | A01M 1/145 | 43/113 |
| 8,800,198 B2 * | 8/2014 | Frisch | A01M 1/145 | 43/113 |
| 9,015,988 B2 * | 4/2015 | Zhang | A01M 1/145 | 43/107 |
| 9,832,986 B2 * | 12/2017 | Koo | A01M 1/106 | |
| 9,968,080 B1 * | 5/2018 | Van Kleef | F21K 9/23 | |
| 10,143,191 B2 * | 12/2018 | Studer | A01M 1/145 | |
| 10,327,435 B2 * | 6/2019 | Studer | A01M 1/145 | |
| 10,337,675 B2 * | 7/2019 | Van Kleef | A01M 1/145 | |
| 10,412,953 B2 * | 9/2019 | Van Kleef | F21V 23/06 | |
| 10,470,453 B2 * | 11/2019 | Zheng | H05C 1/06 | |
| 10,798,933 B2 * | 10/2020 | Studer | A01M 1/145 | |
| 10,973,217 B2 * | 4/2021 | Studer | A01M 1/145 | |
| 11,109,583 B2 * | 9/2021 | Parnell | A01M 1/145 | |
| 2006/0218851 A1 * | 10/2006 | Weiss | A01M 1/08 | 43/113 |
| 2009/0038207 A1 * | 2/2009 | Lin | A01M 1/223 | 43/112 |
| 2010/0236133 A1 * | 9/2010 | Frisch | A01M 1/145 | 43/113 |
| 2011/0283597 A1 * | 11/2011 | Coventry | A01M 1/023 | 43/107 |
| 2013/0097918 A1 * | 4/2013 | Coventry | A01M 1/106 | 43/107 |
| 2013/0312314 A1 * | 11/2013 | Greening | A01M 1/023 | 43/114 |
| 2014/0223803 A1 * | 8/2014 | Hariyama | A01M 1/04 | 43/107 |
| 2014/0362560 A1 * | 12/2014 | Formico | A01M 1/04 | 362/96 |
| 2016/0021865 A1 * | 1/2016 | Koo | A01M 1/08 | 43/113 |
| 2017/0303523 A1 * | 10/2017 | Sandford | F21V 3/00 | |
| 2018/0116195 A1 * | 5/2018 | Zhang | F21K 9/232 | |
| 2018/0199563 A1 * | 7/2018 | Zheng | A01M 1/106 | |
| 2018/0288993 A1 * | 10/2018 | Focks | A01M 1/06 | |
| 2019/0090470 A1 * | 3/2019 | Lee | A01M 1/08 | |
| 2019/0104717 A1 * | 4/2019 | Ali | A01M 1/2005 | |
| 2019/0133106 A1 * | 5/2019 | Eom | A01M 1/08 | |
| 2019/0208760 A1 * | 7/2019 | Towne | A01M 1/145 | |
| 2019/0307114 A1 * | 10/2019 | Cajigas | A01M 1/02 | |
| 2019/0350184 A1 * | 11/2019 | Chang | A01M 1/145 | |
| 2019/0350185 A1 * | 11/2019 | Mcgowan | A01M 1/145 | |
| 2019/0357516 A1 * | 11/2019 | Chang | G01J 1/44 | |
| 2020/0138003 A1 * | 5/2020 | Shoemaker, Jr. | A01M 1/106 | |
| 2020/0214279 A1 * | 7/2020 | Tsai | A01M 1/145 | |
| 2020/0260713 A1 * | 8/2020 | Parnell | A01M 1/145 | |
| 2021/0212306 A1 * | 7/2021 | Tsai | A01M 1/145 | |
| 2021/0352885 A1 * | 11/2021 | Fish | A01M 1/145 | |
| 2021/0368763 A1 * | 12/2021 | Fish | A01M 1/145 | |
| 2022/0039366 A1 * | 2/2022 | Parnell | A01M 1/145 | |

FOREIGN PATENT DOCUMENTS

| | | | | |
|---|---|---|---|---|
| GB | 2420957 A * | 6/2006 | | A01M 1/223 |
| GB | 2456585 A * | 7/2009 | | A01M 1/145 |
| JP | 2001086916 A * | 4/2001 | | |
| JP | 2004275069 A * | 10/2004 | | |
| JP | 2007289122 A * | 11/2007 | | |
| KR | 20080100718 A * | 11/2008 | | |
| WO | 2012074795 | 6/2012 | | |
| WO | 2013052177 | 4/2013 | | |
| WO | WO-2014104197 A1 * | 7/2014 | | A01M 1/145 |
| WO | 2014134371 | 9/2014 | | |
| WO | WO-2020079415 A1 * | 4/2020 | | A01M 1/04 |

* cited by examiner 11,369,104 B2

PEST TRAP

BACKGROUND OF THE INVENTION

This invention relates to a flying pest trap and to an immobilisation section therefore.

A flying pest trap typically comprises a housing containing an attraction section, such as an electrically powered light source that emits UV light (usually in addition to visible light), and an immobilisation section, such as a glueboard (usually a board carrying an adhesive that retains the pests when they make contact with the glueboard.

The light source is typically chosen to offer the broadest attraction to the widest range of flying pests likely to be encountered.

The flying pest trap functions by attracting flying pests, such as insects, including various types of fly and moth, to the light source. When in the vicinity of the light source the pest will explore the area and come into contact with the glueboard and thereby become immobilised. The glueboard can periodically be replaced when it becomes loaded with trapped pests.

Efficiency and power consumption are factors that affect the cost of running a pest trap.

SUMMARY OF THE INVENTION

It is an object of the present invention to address the above mentioned issues.

According to an aspect of the present invention there is provided a flying pest trap comprising an attraction section, an immobilisation section, a body section adapted to retain the attraction section and the immobilisation section, and a power section adapted to provide power to the attraction section, wherein the attraction section includes at least one light source that is adapted to emit light through at least one opening in the immobilisation section.

According to an aspect of the present invention there is provided a flying pest trap comprising an attraction section, an immobilisation section, a body section adapted to retain the attraction section and the immobilisation section, and a power section adapted to provide power to the attraction section, wherein the attraction section includes at least one light source located behind the immobilisation section.

The light sources may be located behind openings in the immobilisation section.

The location behind the immobilisation is taken with respect to a front face of an immobilisation section that is presented forwards to immobilise flying pests attracted, in use, to the pest trap.

The light source may be chosen for emitting UV light as a source of attraction.

The immobilisation section may include a glueboard as a means of immobilisation.

The immobilisation section may include a carrier, which may be translucent. The carrier may be adapted to receive the glueboard, preferably in rails thereof.

The attraction section may include LED light sources, which LEDs may be carried on a printed circuit board, PCB. The carrier may be adapted to have the PCB secured thereto. The PCB may be attachable to a rear of the carrier. The LEDs may, in use, transmit light through the carrier. The carrier may be receivable in a part of the immobilisation section, preferably in rails thereof.

The attraction section may include at least one light source located forwards of the immobilisation section; said light source may be a fluorescent tube-type light source.

The invention extends to an immobilisation section of a pest trap incorporating openings arranged to allow light from a light source to pass through said openings.

All of the features described herein can be combined with any of the above aspects in any combination.

BRIEF DESCRIPTION OF THE DRAWINGS

For a better understanding of the invention and to show how the same may be brought into effect, embodiments of the same will now be described with reference to the accompanying drawings, in which.

DETAILED DESCRIPTION

Figure 1:
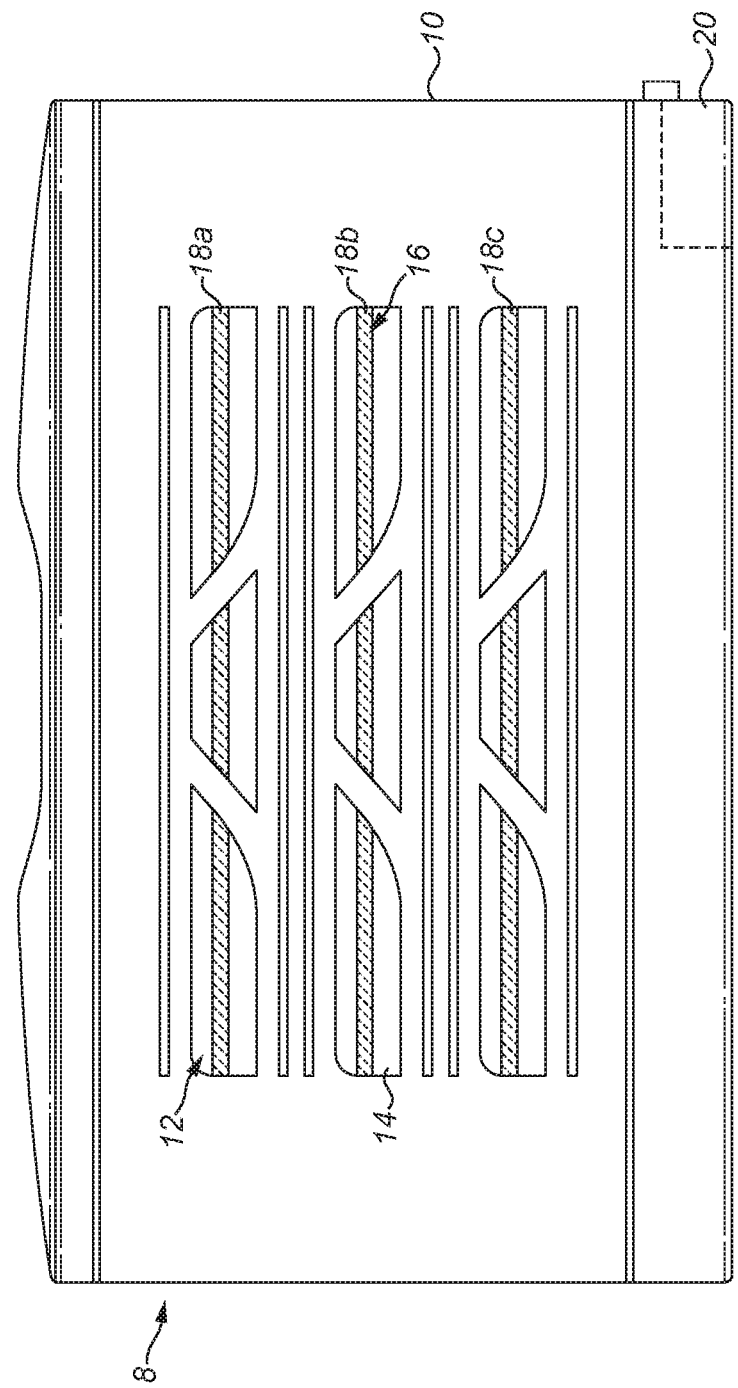
FIG. 1 is a schematic front view of a prior art flying pest trap.

Existing pest traps for flying pests, an example of which is a pest trap 8 as shown in FIG. 1 comprise a body 10, an immobilisation section 12 that includes a glueboard 14 and an attraction section 16 that includes one or more light sources 18a,b,c, which typically are chosen to output at least partly in the UV spectrum to attract pests, such as flies and moths. The pest trap 8 includes a power section 20 that receives power from an external source and provides power to the attraction section 16.

Effective pest traps combine both direct and reflected UV irradiance, to maximise output and attract flying insects. The UV is emitted directly to the environment from the light sources 18a-c and also UV from the light sources 18a-c that hits the glueboard 14 for example is reflected by the glueboard and then outwards to the environment.

Effective pest traps position the light sources 18a-c as close as possible to the immobilisation section 12, especially the glueboard 14. If parts of the glueboard 14 are too far away from the light sources 18a-c, they will not catch insects, or the effectiveness will be substantially reduced.

Light sources 18a-c are typically UV fluorescent tubes that sit in front of the glueboard 14, ensuring as much of the glueboard 14 as possible is 'useful' for catching flies or other flying pests.

If LEDs are used as an attraction section 16 UV source, then due to their wiring requirements, they cannot sit in front of the glueboard 14, because the typical point source of an LED cannot replicate the 360 degree illumination of a fluorescent tube. As a result, typically, LEDs 15 are positioned around a perimeter of the glueboard 14, as shown in FIG. 2.

Figure 2:
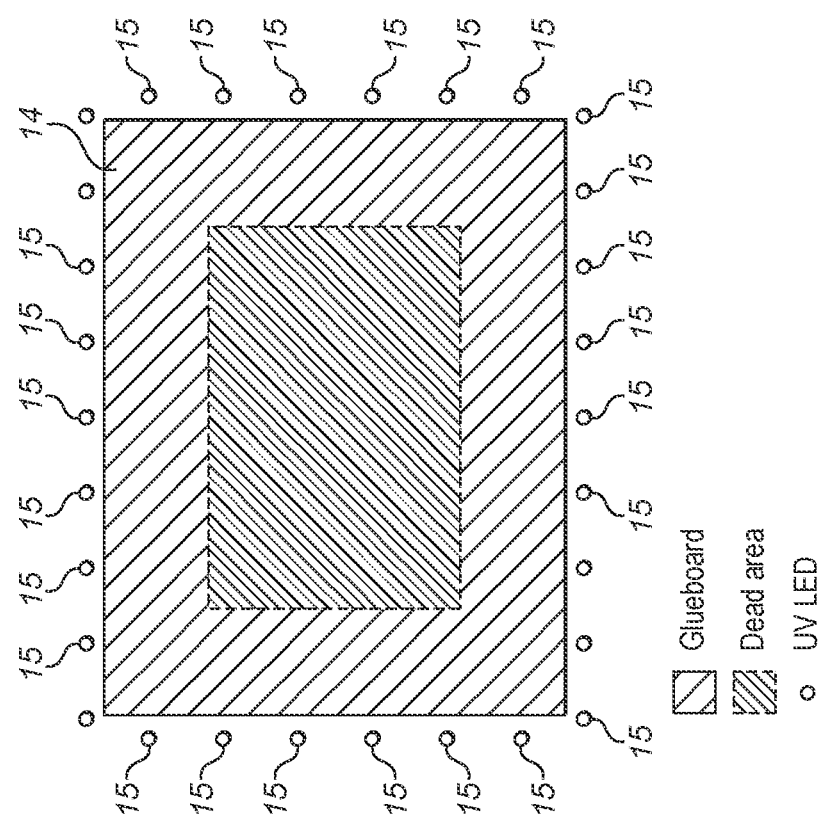
FIG. 2 is a schematic plan view of a glueboard of a flying pest trap with a prior art peripheral arrangement of LED light sources.

There is a disadvantage of this arrangement, because it results in a significant 'dead' area towards the centre of the glueboard 14 at which there is no illumination from the LEDs 15, as shown in FIG. 2.

Figure 3:
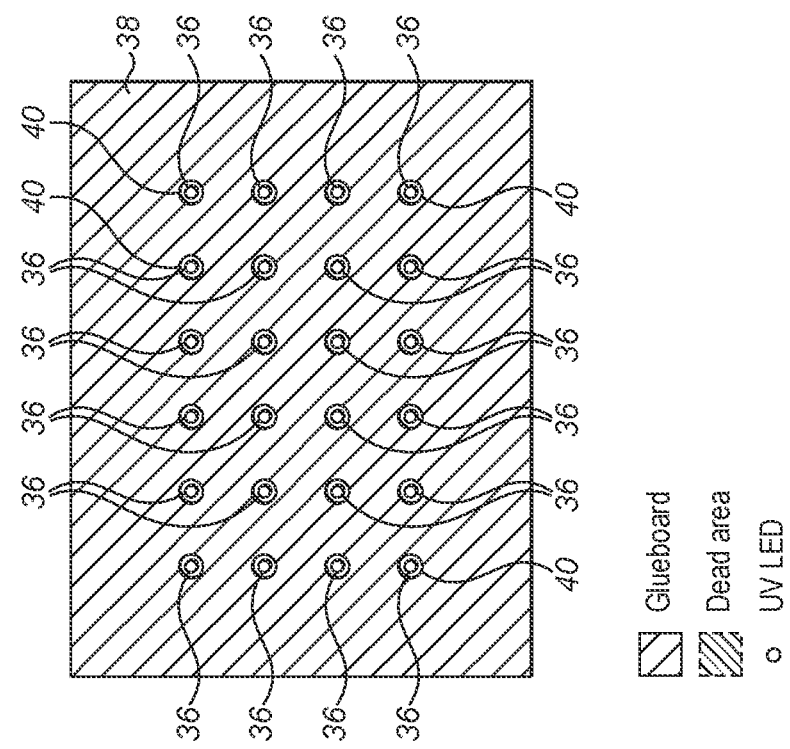
FIG. 3 is a schematic plan view of a glueboard of a flying pest trap according to an embodiment of the invention with an array of LED light sources located in openings in the glueboard.

FIG. 3 shows a configuration of UV-emitting LEDs 36 according to an embodiment of the invention. The LEDs 36 are arranged in a pattern that may be evenly spread 'behind' a glueboard 38, with appropriate apertures 40 cut into the glueboard to allow light-emitting parts of the LEDs 36 to allow UV irradiance to get to the front face of the glueboard 38. Only some apertures 40 are given reference numerals to assist clarity. Each LED 36 is associated with an aperture 40. Therefore, the use of at least one LED 36 protruding through the glueboard 38 offers advantages in light spread.

The arrangement in FIG. 3 reduces and/or removes 'dead areas' in the illumination spread from the LED light sources 36 on the glueboard 38. The spread of light is shown in FIG. 3 to be much more even by the lack of dead spots in the light spread that is emitted by the LEDs 36.

Figure 4:
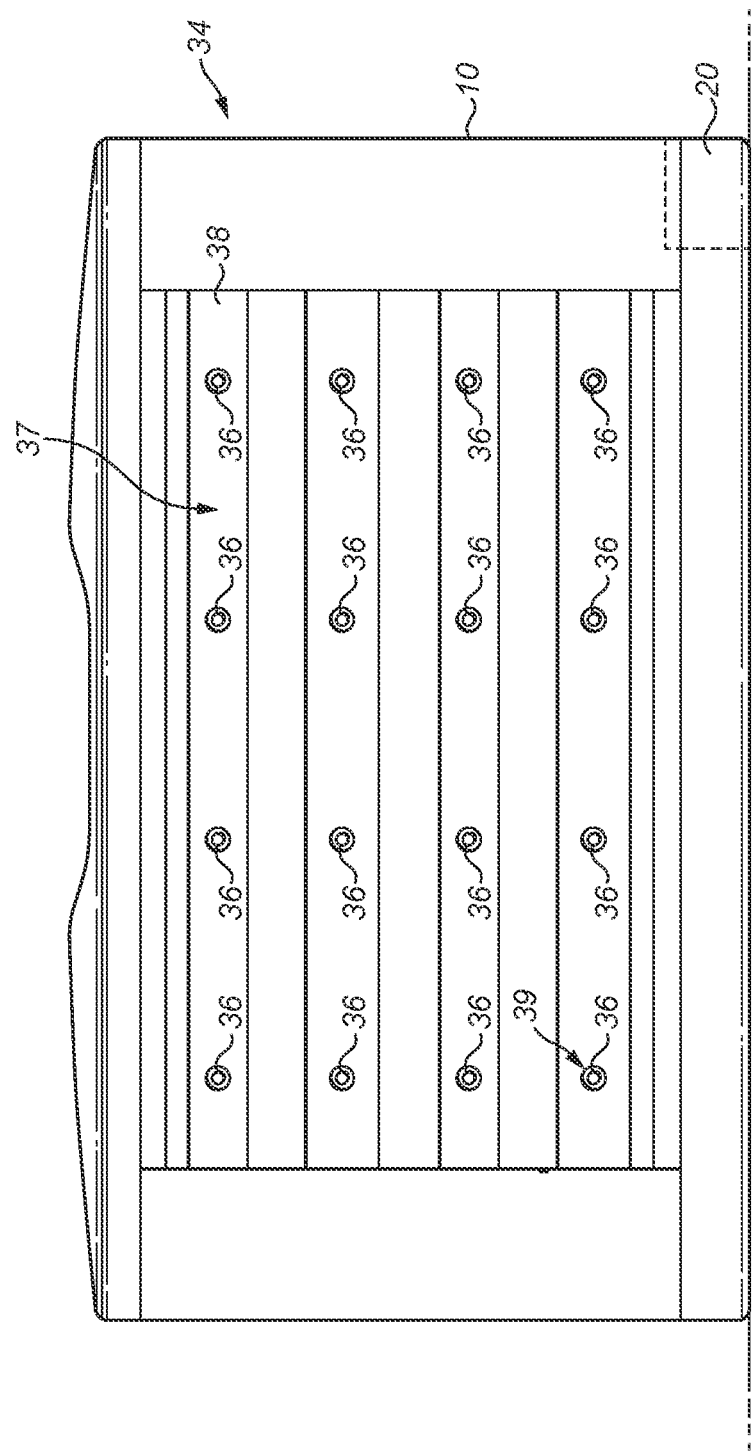
FIG. 4 is a schematic front view of a flying pest trap according to an embodiment of the invention incorporating the glueboard of FIG. 3.

FIG. 4 shows a flying pest trap 34 that incorporates the glueboard 38 shown in FIG. 3 as part of an immobilisation section 37. The flying pest trap 34 includes a body 10 and a power section 20, similar in functionality to those shown in FIG. 1. The body 10 includes rails (see FIG. 7) in which a glueboard is typically received. Light sources 36 of an attraction section 39 are LEDs 36 arranged in a grid pattern on the glueboard 38 that forms an immobilisation section of the flying pest trap 34.

Figure 5:
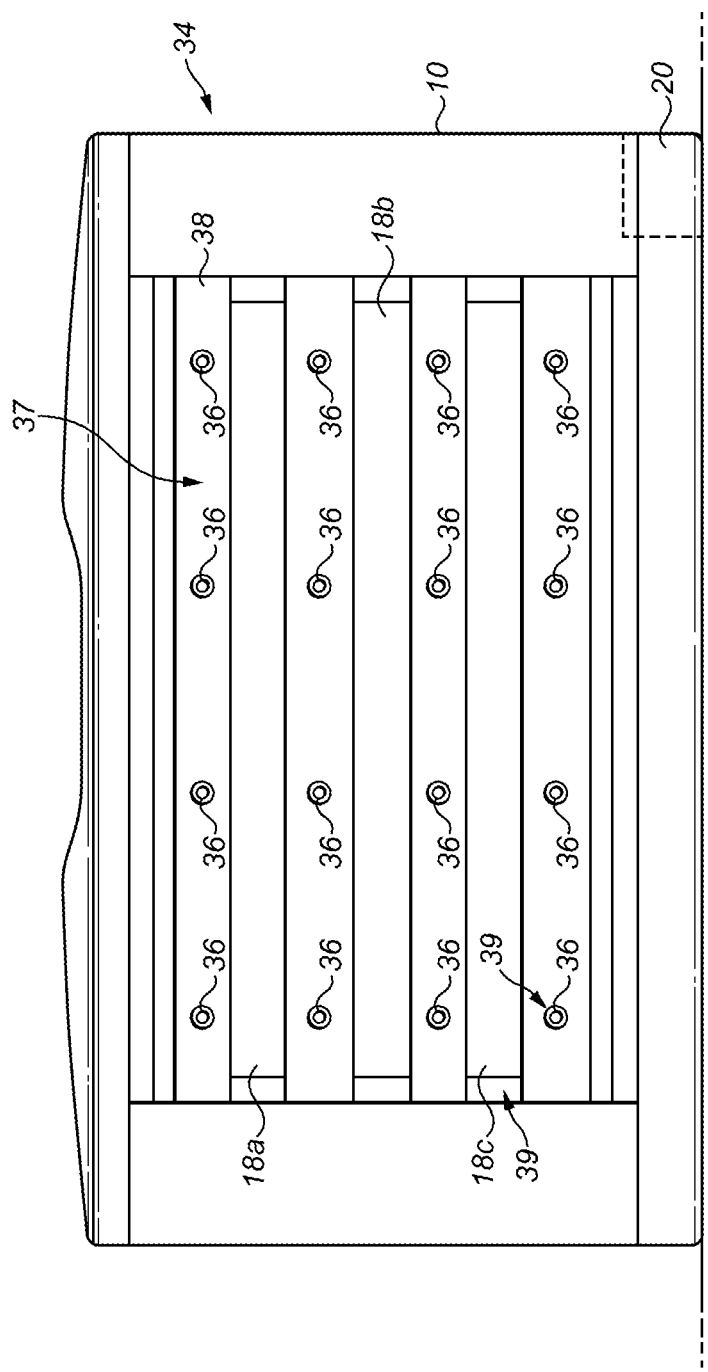
FIG. 5 is a schematic perspective view of a flying pest trap according to an embodiment of the invention incorporating the glueboard of FIG. 3 and an array of fluorescent light sources.

FIG. 5 shows an alternative construction to that in FIG. 4 and includes fluorescent light sources 18*a-c* in addition to the LED light sources. The addition of fluorescent light sources 18*a-c* provides improvements in light spread when combined with the LEDs 36.

Figure 6:
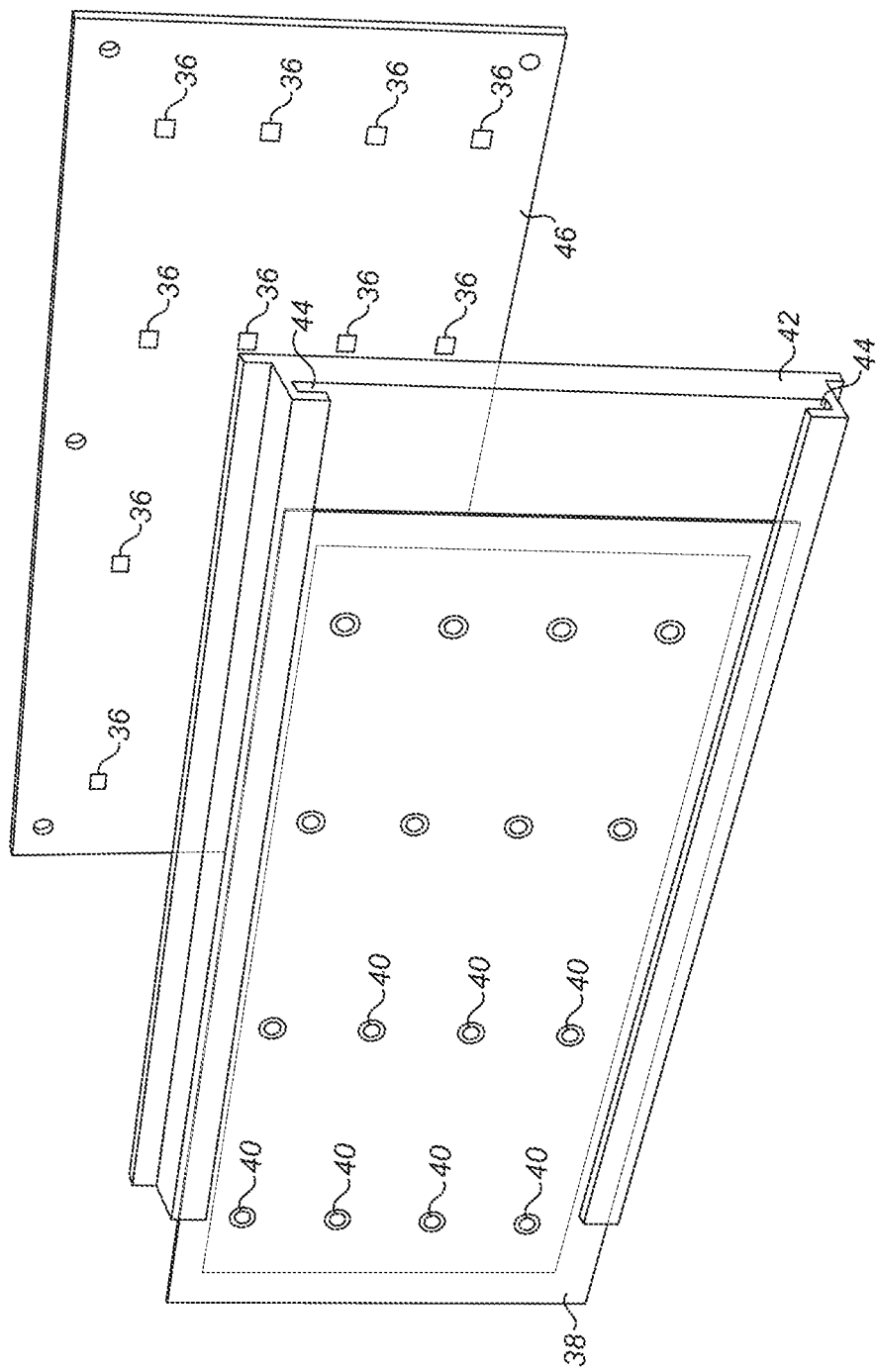
FIG. 6 is a schematic exploded perspective view of an LED glueboard cassette for use in the flying pest trap of FIGS. 4 and/or 5.

FIG. 6 shows how the glueboard 38 for either of the pest traps shown in FIGS. 4 and 5 has apertures 40 and is received in a carrier 42 that includes slots 44 to allow the glueboard 38 to be slid into the carrier 42. The carrier 42 is made of a translucent material, because the LEDs 36 are located on a printed circuit board (PCB) 46 that sits behind the glueboard 38 and is secured to a rear of the carrier 42.

Figure 7:
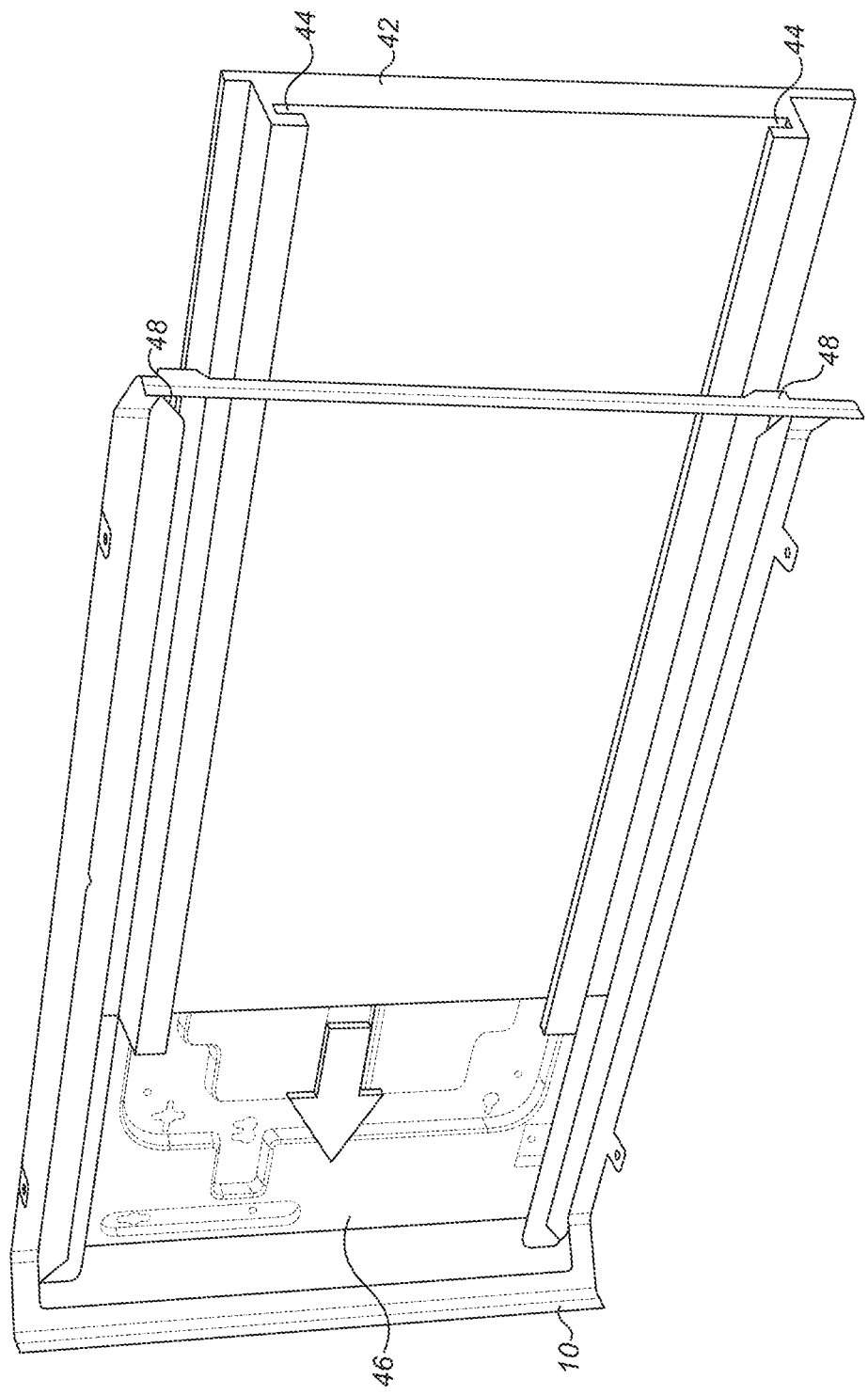
FIG. 7 is a partial schematic perspective view of the LED glueboard cassette of FIG. 6 being inserted into a body section of the flying pest trap of FIGS. 4 and/or 5.

FIG. 7 shows how the PCB 46, glueboard 38 and carrier 42 are inserted into runner grooves or rails 48 in a rear section of the body 10. The runner grooves are the same as those typically used in a prior art immobilisation section 12 to receive a prior art standard glueboard 14, like that shown in FIG. 1. Thus there is advantageous use of an existing body 10 to implement the embodiment described herein. The PCB 46 is electrically connected to the power section to receive an electrical supply to power the LEDs 36.

In use, the evenly spread LEDs 36 provide an even spread of UV light for attracting flying pests to the immobilisation section for immobilisation on the glueboard 38. The glueboard then has a longer life, because the space on the glueboard is used more evenly and there is a reduced likelihood of sections of the glueboard becoming overloaded with trapped pests.

Figure 8:
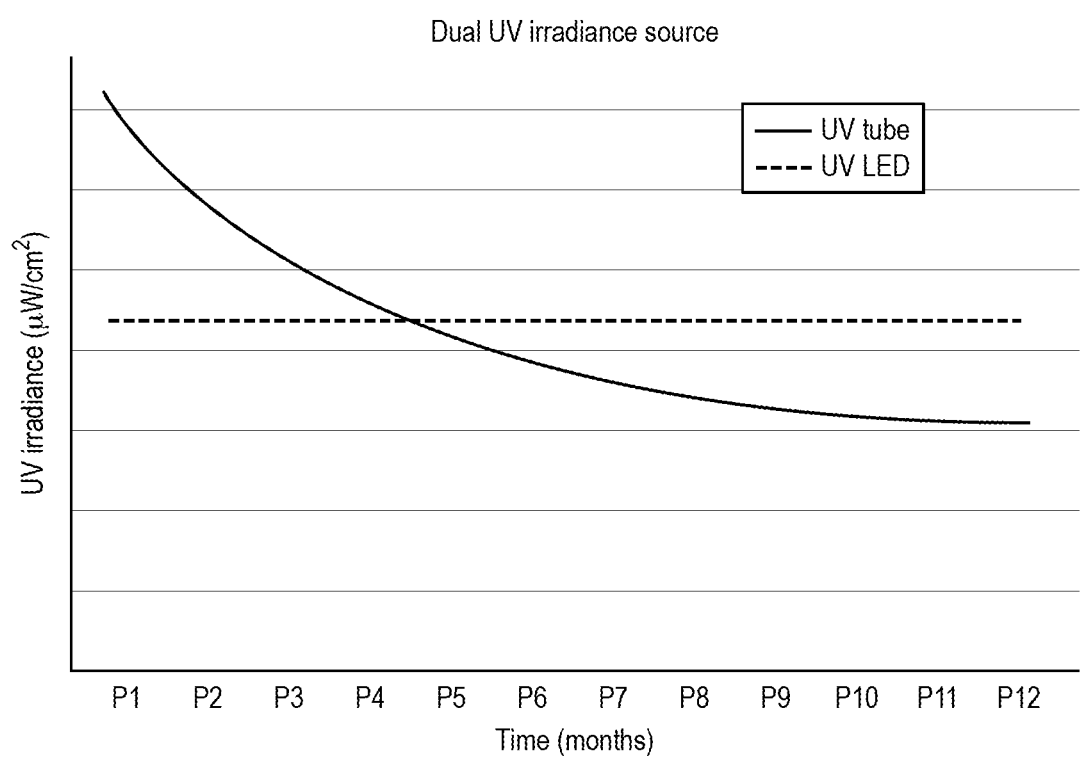
FIG. 8 is a graph of light output from LED and fluorescent light sources respectively.

The use of LEDs 36 is also advantageous because there is no fade in light output over time with LEDs 36 compared to fluorescent tubes 18*a-c*, as shown in the graph of FIG. 8 from which it can be seen that over a period of 12 months or so light output from a fluorescent tube may reduce by 25% or more, whereas no reduction is experienced with LEDs. The light output of fluorescent tubes 18*a-c* reduces significantly over time, which reduces the attractive power of the attraction section over time.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A flying pest trap comprising an attraction section, an immobilisation section, a body section adapted to retain the attraction section and the immobilisation section, and a power section disposed in the body section adapted to provide power to the attraction section, wherein the attraction section includes a plurality of LED light sources carried on a printed circuit board located behind the immobilisation section,
   wherein the light sources are located behind openings in the immobilisation section,
   wherein the light sources are UV light sources,
   wherein the immobilisation section includes a glueboard, and the openings are provided in the glueboard by being cut into the glueboard,
   wherein the light sources are arranged in an evenly spread pattern behind the glueboard, and the openings cut into the glueboard allow light-emitting parts of the light sources to emit light therethrough and thereby allow UV irradiance to get to a front face of the glue board,
   wherein each opening of the openings cut into the glueboard is associated with a single LED light source of the plurality of LED light sources,
   wherein the body section comprises a receiving portion, the printed circuit board being slidably attachable along the receiving portion to connect to the power section disposed in the body section,
   wherein the immobilisation section includes a carrier including rails that receive the glueboard, and
   wherein rails of the receiving portion of the body section slidably receive the printed circuit board and the carrier.

2. A flying pest trap according to claim 1, wherein the carrier is translucent.

3. A flying pest trap according to claim 1, wherein the attraction section includes at least one light source located forwards of the immobilisation section.

* * * * *